June 9, 1931.  V. G. APPLE  1,808,747
DYNAMO ELECTRIC MACHINE
Filed June 14, 1928
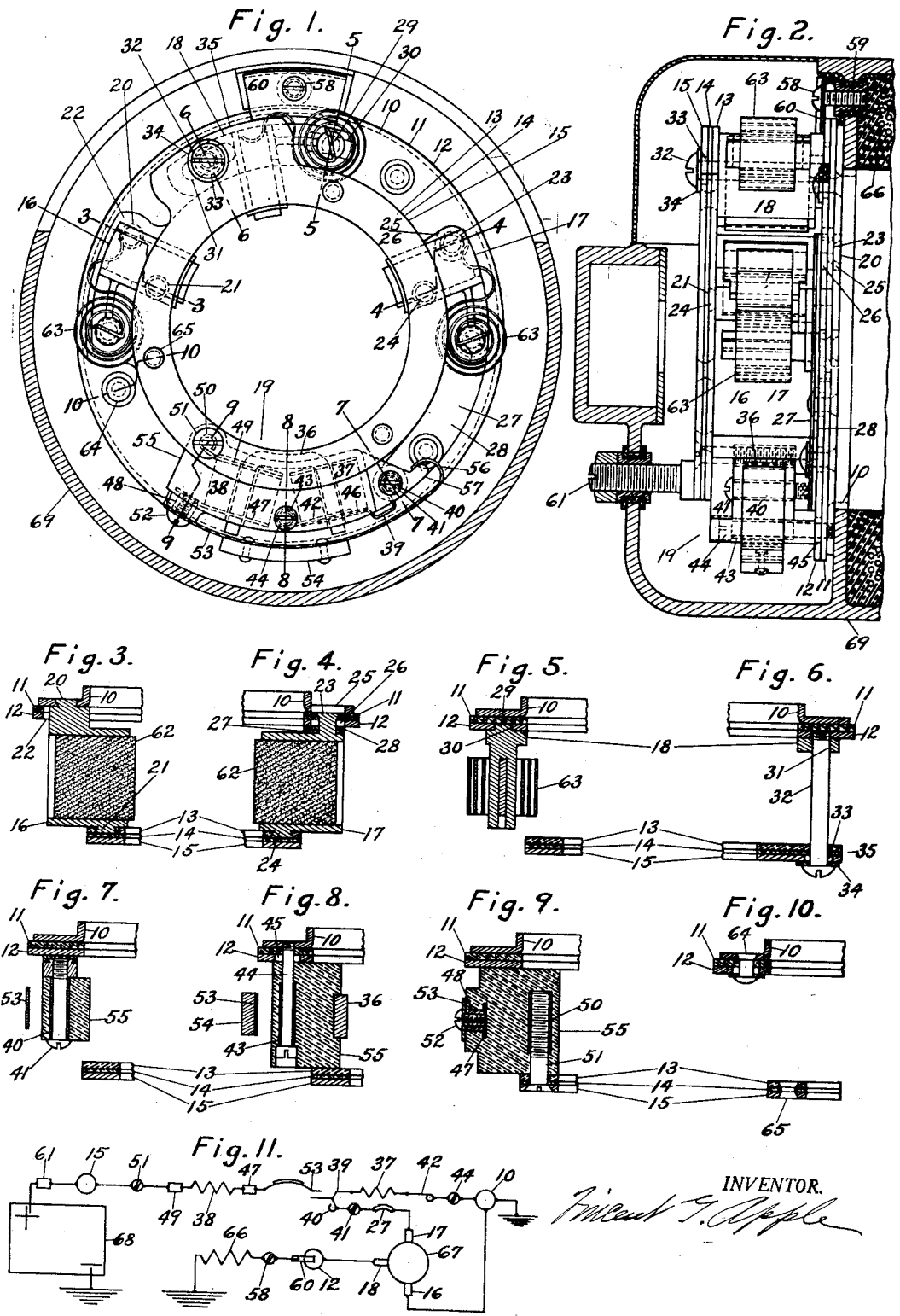
INVENTOR.

Patented June 9, 1931

1,808,747

UNITED STATES PATENT OFFICE

VINCENT G. APPLE, OF DAYTON, OHIO

DYNAMO ELECTRIC MACHINE

Application filed June 14, 1928. Serial No. 285,364.

My invention relates particularly to battery charging dynamos and more specifically to the brush rigging thereof, and an object of my invention is to provide a unit which carries not only the brushes or current collecting means but the regulation and cutout means necessary to the dynamo as well, and this without loose wires or flexible leads associated therewith as is common practice.

Other objects will become apparent to those skilled in the art as the invention is described in detail and reference is made to the drawings, wherein—

Fig. 1 is an end view and Fig. 2 a side view of my improved device.

Figs. 3, 4, 5, 6, 7, 8, 9, and 10 are cross sections thru Fig. 1 at 3—3, 4—4, 5—5, etc.

Fig. 11 is a diagram showing a circuit thru a battery and dynamo containing my improved device.

Similar numerals refer to similar parts thruout the several views.

A battery charging dynamo and especially one which is to be driven by a source of power having a wide range of speeds such for instance as an automotive engine usually has associated therewith two accessories to insure its proper functioning, one a regulating device which guards against the production of too great a current at the higher engine speed and the other, commonly called a cutout, which disconnects the battery from the dynamo when the dynamo produces a current less in value than that of the battery.

A form of regulating device largely employed is the third brush or regulating brush which is placed, relative to the regular brushes, in a position off of normal so that the current collected thereby to supply the field winding varies more or less in inverse ratio as the speed changes. Regulating brushes of this type are usually adjustable circumferentially about the axis of the dynamo to obtain regulation best suited to the conditions of speed had in the driving source.

A cutout as commonly constructed comprises one coil shunted across the dynamo brushes, a second coil having the battery resistance in series therewith also across the brushes, and a switch which makes or breaks the circuit of which the second coil is a part, said switch being adapted to be closed by said first coil, so that when sufficient current is generated by the dynamo to equal that of the battery the first coil closes the circuit thru the second coil and battery and when a current less in value than that of the battery is being generated said first coil is weakened because of the lesser current and further weakened by the reversal of the current in the second coil so that the switch is opened and the circuit thru the battery is broken. The principles of regulation and the type of cutout employed in my improved device are well known and understood in the art and need not be further described.

Referring to the drawings, one group comprising rings 10, 11 and 12 is spaced apart from another group comprising relatively smaller rings 13, 14 and 15 by negative brush holder 16, positive brush holder 17, regulating brush holder 18 and cutout unit 19. Ring 10 is of metal and rests directly against the dynamo frame 69. Ring 11 is of insulating material and electrically separates ring 10 from ring 12 which is also of metal. Rings 13 and 14 are of insulating material and ring 15 is of metal.

Negative brush holder 16 is riveted to metal ring 10 at 20 and to insulation ring 13 at 21 (see Fig. 3), a portion of rings 11 and 12 being cut away to prevent contact of brush holder 16 therewith. Positive brush holder 17 is riveted to insulation ring 11 at 23 and to insulation ring 13 at 24 (see Fig. 4), clearance holes 25 and 26 preventing contact of brush holder 17 and metal rings 10 and 12. A segment 27 of metal connects positive brush holder 17 with the cutout unit and a similarly shaped segment 28 of insulating material prevents contact of metal segment 27 with metal ring 12.

Regulating brush holder 18 is adjustably held between the two groups of rings and resting on metal ring 12 is thus electrically connected thereto a lug 29 on brush holder 18 which has limited movement in elongated slot 30 of ring 12 (see Fig. 5) and a slot 31 in brush holder 18 also permits said limited movement about clamp screw 32 which securely holds brush holder 18 after adjustment is effected (see Fig. 6). A clearance hole 33 in metal ring 15 and an insulating washer 34 prevent contact of clamp screw 32 and metal ring 15. The outwardly extending ears 35 of rings 13, 14 and 15 thru which clamp screw 32 passes may be of the same contour as the clearance 22 in rings 11 and 12 so that sheet stock may be economically used by using central portions of the large rings as stock for the smaller rings.

The cutout unit comprises a V shaped magnet core 36 carrying a shunt coil 37 and a series coil 38. A metal end piece 39 curled to form an eyelet at 40 connects one terminal of shunt coil 37 to segment 27 thru screw 41 (see Fig. 7). Another metal end piece 42 curled to form an eyelet at 43 connects the other terminal of shunt coil 37 thru screw 44 to ring 10 (see Fig. 8). A clearance hole 45 in metal ring 12 prevents electrical contact thereto by screw 44. A washer 46 of insulating material prevents electrical contact between end pieces 39 and 42.

A metal end piece 47 terminating in hub 48 has one end of the series coil 38 attached thereto. Another metal end piece 49 curled at the end 50 has the other end of series coil 38 attached thereto.

The series coil is thus connected by screw 51 to ring 15 and by screw 52 to bronze spring 53 (see Fig. 9). Bronze spring 53 carries cutout armature 54 which is of magnetizable material so that when in operation sufficient current is passed thru shunt coil 37 to close the gap between cutout armature 54 and magnet core 36 a circuit is made thru series coil 38 to ring 15 by contact of spring 53 with metal end 39. A housing 55 of insulating material surrounds the magnet and holds all parts of the cutout unit in correct relation to each other.

The curved end 56 of spring 53 limits the gap between the cutout armature 54 and magnet core 36 by contact with lug 57 of housing 55. A screw 58 entering field terminal 59 draws clamp 60 against ring 12 thus connecting ring 12 to the field coil 66. The other end of the field winding being joined in the instant case to the dynamo frame 69 is in effect connected to ring 10, tho if so desired ring 10 may be insulated from the frame and both ends of the field coil may be connected to terminals similar to terminal 59, the one terminal then contacting ring 12 as shown and the other contacting ring 10.

A screw 61 insulated from the dynamo frame 69 as shown makes contact with ring 15 and conveys the current to or from the external circuit. The screw 61 may serve as a binding post for external wires or it may electrically join to a binding post which is also insulated from the frame. The other wire of the external circuit is in the instant case joined anywhere to the dynamo frame, but if desired it may be joined to an insulated binding post which is electrically connected to ring 10 and to one end of the field winding 66, in which case ring 10 would be electrically insulated from the dynamo frame.

Brushes 62 are provided as in common practice and brush springs 63 of spring bronze are of considerable width to assist in carrying current from the brushes to their holders. The several rings of each series are held together by a number of rivets as at 64 and 65 (see Fig. 10) which mechanically join the rings of a group without electrically connecting any of the metal rings together.

It may be readily seen that by loosening screws 58 and 60 the entire structure may be revolved about its center to any position for inspection and adjustment and by tightening said screws it may be locked in any desired position, the connections completing the electrical circuit remaining the same for any position and without having flexible leads or loose wires connecting any parts thereof.

The circuit thru a battery and charging dynamo equipped with my improved device is shown diagrammatically in Fig. 11 and is electrically similar to that of common practice the improvement consisting principally in the mechanical construction and arrangements of the elements thereof as hereinbefore described.

The armature in diagram Fig. 11 is designated by numeral 67 and the battery by numeral 68.

In addition to the foregoing description of my improvement the details of which are subject to considerable variation, I aim to more clearly define the scope of the invention in the following, wherein I claim—

1. In a dynamo operating at variable current output, a self-contained unit comprising a positive brush, a negative brush, a regulating brush and a cutout, all mounted on a somewhat circular ring, said ring being mounted on the dynamo frame and revolvable about the dynamo axis, and contact members positioned on the dynamo frame to convey current to and from said ring and adapted to convey said current equally at any position to which said ring may be revolved.

2. In a dynamo operating at variable current output, a self-contained unit comprising a positive brush, a negative brush, a regulating brush and a cutout, all mounted on a somewhat circular ring, said ring being mounted on the dynamo frame and revolvable about the dynamo axis and contact members positioned on the dynamo frame to convey current to and from said ring equally at any position to which said ring may be revolved, said contact members being adapted to be loosened to permit rotation of said ring and tightened to lock said ring in any desired position.

3. In a dynamo operating at variable current output, a self-contained unit comprising a positive brush, a negative brush, a regulating brush and a cutout, all mounted on a somewhat circular ring, said regulating brush being circumferentially adjustable relative to said ring and said cutout being removable therefrom as a separate self-contained unit, said ring being mounted on the dynamo frame and revolvable about the dynamo axis and contact members positioned on the dynamo frame adapted to convey current equally to said ring at any position to which it may be revolved, said contact members being adapted to be loosened to permit rotation of said ring and tightened to lock said ring in any desired position.

4. In a dynamo operating at variable current output, a self-contained unit comprising a positive brush, a negative brush, a regulating brush and a cutout, all mounted on a somewhat circular ring, said ring being of laminar structure, the laminae serving as conductors for the parts mounted thereon and to keep said parts properly positioned, said ring being mounted on the dynamo frame and circumferentially adjustable thereon, contact members rigidly mounted on the dynamo frame adapted to convey current to and from the laminae of said ring at any position of its circumferential adjustment without flexible leads connecting the stationary and movable parts.

5. In an automotive dynamo, a field winding, a fixed field terminal, an insulated metal ring mounted within said dynamo revolvable about the axis thereof and in continuous electrical contact with said terminal in any position of said ring, a regulating brush mounted on and in electrical contact with said ring and having limited circumferential movement on said ring.

6. In a battery charging dynamo, a fixed line terminal, an insulated metal ring mounted within said dynamo revolvable about the axis thereof and in continuous electrical contact with said terminal, a cutout mounted on said ring to revolve therewith, a series coil on said cutout having one end connected to said ring, and a dynamo brush adapted to be connected to the other end of said coil, said brush being mounted to revolve with said ring but insulated therefrom.

7. In a variable speed charging dynamo having a field winding, the combination of a fixed field terminal a fixed line terminal, a unitary structure composed of insulatedly spaced conductive rings revolvable about the axis of said dynamo, main brushes, a regulating brush and a cutout all mounted on said unitary structure and revolvable therewith, a series coil on said cutout, one of said rings being in electrical contact with said field terminal and said regulating brush, and another of said rings being in electrical contact with said line terminal and with one end of said cutout coil, the other end of said cutout coil being adapted to be connected to a main brush by closing of said cutout.

8. In a variable speed charging dynamo, a field frame, an insulated field terminal fixed on said frame, a field winding having one end connected to said terminal and the other end to said frame, a fixed line terminal, a unitary structure composed of an inner, a middle and an outer conductive ring insulated from each other and revolvable about the axis of said dynamo the inner ring being in contact with said frame, a positive main brush, a negative main brush, a regulating brush and a cutout all mounted on said unitary structure to revolve therewith, a series coil and a shunt coil on said cutout, said shunt coil having one end connected to the inner ring and the other end to the positive brush, said series coil having one end connected to the outer ring and the other end connected to the positive brush when said cutout is closed, said regulating brush being in electrical contact with said middle ring, said negative brush being in electrical contact with said inner ring, said positive brush being electrically insulated from all said rings, said fixed field terminal being always in contact with said middle ring and said fixed line terminal being always in contact with said outer ring in any position in which said rings may be rotated.

In testimony whereof I hereunto set my hand.

VINCENT G. APPLE.